2,971,964
Patented Feb. 14, 1961

2,971,964
PREPARATION OF 11α-HYDROXY PROGESTERONE

Edward S. Rothman, Philadelphia, and Monroe E. Wall, Oreland, Pa., assignors to the United States of America as represented by the Secretary of Agriculture No Drawing. Filed Mar. 4, 1958, Ser. No. 719,171
9 Claims. (Cl. 260—397.45)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of 11α-hydroxy progesterone (11α-hydroxy-4-pregnene-3,20-dione). More particularly, this invention relates to an all-chemical process for making 11α-hydroxy progesterone and to novel intermediates which originate in this process.

The compound 11α-hydroxy progesterone is a valuable precursory substance for the commercial preparation of cortisone. Although 11α-hydroxy progesterone is currently prepared by the microbiological oxidation of progesterone, a process based entirely upon chemical reactions is highly desirable. In the copending patent application, Serial No. 566,737, filed February 20, 1956, new botanical products, gentrogenin and correllogenin, were described. Our copending patent application, Serial No. 691,780, filed October 22, 1957, described the preparation from gentrogenin and correllogenin of the sapogenin derivatives, 11α-hydroxy diosgenin and 11α-hydroxy yamogenin. We have now discovered a chemical process for converting 11α-hydroxy diosgenin, 11α-hydroxy yamogenin, and the mono- and di-acetates of these compounds to 11α-hydroxy progesterone.

An object of the present invention is to provide an all-chemical process for preparing 11α-hydroxy progesterone from compounds obtained from plant sources. A particular object of this invention is to prepare 11α-hydroxy progesterone from 11α-hydroxy diosgenin and its isomer, 11α-hydroxy yamogenin. Another object is to describe novel intermediate compounds, possessing a 5,6-dehydro-3β-hydroxy system which were prepared in developing this process. The following equations show the process of this invention:

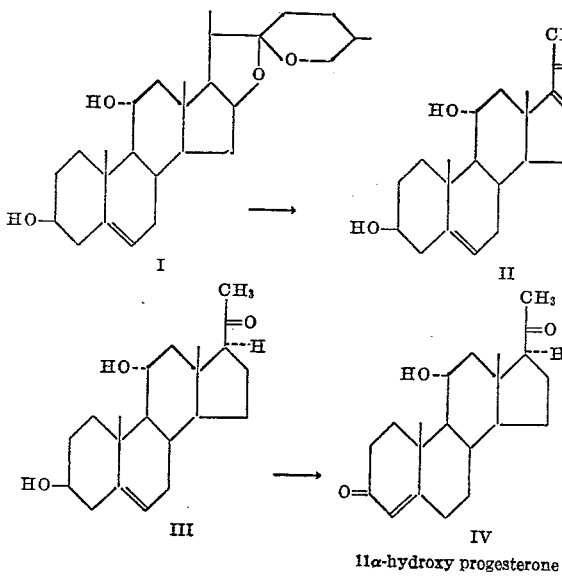

11α-hydroxy progesterone

According to the present invention one or more compounds selected from 11α-hydroxy diosgenin (compound I in the above equations), 11α-hydroxy yamogenin and their corresponding 3,11-diacetates or 11-monoacetates are converted to pseudosapogenin acetates, and the pseudosapogenin acetates are subjected to oxidative cleavage and alkaline hydrolysis to produce the new compound, 3β,11α-dihydroxy-5,16-pregnadiene-20-one (II). Reduction of II using an appropriate catalyst such as 10% palladium on barium sulfate gives 3β,11α-dihydroxy-5-pregnene-20-one (III) which is oxidized according to Oppenauer oxidation conditions, for example, aluminum isopropoxide and cyclohexanone in an inert solvent such as toluene, to 11α-hydroxy-4-pregnene-3,20-dione (IV), (11α-hydroxy progesterone). It is worthy of note that the Oppenauer oxidation takes a selective course and causes oxidation only of the 3β-hydroxyl group and does not affect the 11α-hydroxyl group.

The process of this invention will be further illustrated by the following examples.

Example 1

Preparation of 3β,11α-dihydroxy-5,16-pregnadiene-20-one.—Two grams of 11α-hydroxy-diosgenin were heated for five hours at 175° C. in 5 ml. of acetic anhydride containing a trace of acetic acid. The sealed reaction tube was cooled, opened and solvents were removed in vacuo. The glassy residue was dissolved in 50 ml. of acetic acid at 13° C. and was oxidized with 800 mg. of chromium trioxide dissolved in 2.5 ml. of water and 2.5 ml. of acetic acid. The time allotted for the oxidation was one hour and the temperature was allowed to rise to 25° C. during the latter half of the reaction period. The mixture was then diluted with water and extracted with benzene. The organic layer was separated, washed with water and evaporated to dryness. The residue, dissolved in 60 ml. of tertiary butanol was violently agitated with a solution of 2 g. of potassium hydroxide in 3 ml. of water. If the reaction was stopped after only two hours, and the steroid collected by dilution with water and extraction with benzene, it was found that the product isolated was the 11α-monoacetate of 3β,11α-dihydroxy-5,16-pregnadiene-20-one, M.P. 183–185° C., $$\lambda_{max.}^{meOH}\ 235\ m\mu$$

$\epsilon=8180$, log $\epsilon=3.92$, $[\alpha]_D^{25}=-44.5°$. However, if the agitation of the butanolic aqueous caustic two-phase system was prolonged to 24 hours, complete saponification occurred to form 3β,11α-dihydroxy-5,16-pregnadiene-20-one, M.P. 209–214° C., unchanged by repeated recrystallization, $$\lambda_{max.}^{meOH}\ 238\ m\mu$$

$\epsilon=8,300$, log $\epsilon=3.92$, $[\alpha]_D^{25}=-14.8°$. The compound was further characterized as the diacetate, M.P. 144–145°, $$\lambda_{max.}^{meOH}\ 234\ m\mu$$

$\epsilon=8,875$, log $\epsilon=3.95$, $[\alpha]_D^{25}=-40.3$.

These same products are obtained if 11α-hydroxy yamogenin, 11α-acetoxy diosgenin, 11α-acetoxy yamogenin, 3β,11α-diacetoxy diosgenin, and 3β,11α-diacetoxy yamogenin are used as the starting materials. Conditions for preparing the pseudosapogenin acetate may vary, usually being 3 to 20 hours at 170°–200° C.

Example 2

Preparation of 3β,11α-dihydroxy-5-pregnene-20-one.—A sample of 3β,11α-dihydroxy-5,16-pregnadiene-20-one, 200 mg., in 100 ml. of ether and 1.5 g. of a commercial 10% palladium on barium sulfate were shaken for two hours with hydrogen at 3 atmospheres' pressure. Pure palladium or palladium on other supports such as calcium carbonate are also usable as catalysts for this hydrogenation. The catalyst was filtered off and the product was obtained by crystallization from the ether as fibrous filaments, M.P. 181.5–182° C., $[\alpha]_D^{25}=+70°$. The product was transparent to ultraviolet in the 230–245 m$\mu$ region.

Example 3

*Preparation of 11α-hydroxy progesterone.*—Two hundred milligrams of 3β,11α-dihydroxy-5-pregnene-20-one was oxidized by the Oppenauer procedure, typically by refluxing in 20 ml. of dry toluene with 3 ml. of cyclohexanone and 600 mg. of aluminum isopropoxide for 0.75 hour. Water, 100 ml., was added and the mixture was distilled until a pasty mass separated at the surface of the residual water. Crystallization from aqueous methanol gave 180 mg. of 11α-hydroxy progesterone identical in every respect with a reference standard sample.

We claim:

1. A process for preparing 11-alpha-hydroxy progesterone comprising converting a sapogenin derivative selected from the group consisting of 11-alpha-hydroxy diosgenin, 11-alpha-hydroxy yamogenin, and the respective mono- and di-acetates thereof to its pseudosapogenin acetate by heating in acetic anhydride containing a trace of acetic acid for 3 to 20 hours at 170–200° C., oxidizing the pseudosapogenin acetate with chromium trioxide in cold, aqueous acetic acid to produce oxidized pseudosapogenin acetate, hydrolyzing the oxidized pseudosapogenin acetate by the prolonged contact with potassium hydroxide in tertiary butanol to produce 3-beta,11-alpha-dihydroxy-5,16-pregnadiene-20-one, reacting the latter with hydrogen in the presence of a palladium catalyst to hydrogenate the 16,17 double bond to produce 3-beta,11-alpha-dihydroxy-5-pregnene-20-one, and then oxidizing said 3-beta,11-alpha-dihydroxy-5-pregnene-20-one with an aluminum tertiary alkoxide and cyclohexanone in an inert organic solvent to form 11-alpha-hydroxy progesterone.

2. The process of claim 1 in which the sapogenin derivative is 11α-hydroxy diosgenin.

3. The process of claim 1 in which the sapogenin derivative is 11α-hydroxy yamogenin.

4. A process for preparing 3-beta,11-alpha-dihydroxy-5,16-pregnadiene-20-one comprising converting a sapogenin derivative selected from the group consisting of 11-alpha-hydroxy diosgenin, 11-alpha-hydroxy yamogenin, and the respective mono- and di-acetates thereof to its pseudosapogenin acetate by heating in acetic anhydride containing a trace of acetic acid for 3 to 20 hours at 170°–200° C., oxidizing the pseudosapogenin acetate with chromium trioxide in cold, aqueous acetic acid to produce oxidized pseudosapogenin acetate, and hydrolyzing the oxidized pseudosapogenin acetate by prolonged contact with potassium hydroxide in tertiary butanol to produce 3-beta,11-alpha-dihydroxy-5,16-pregnadiene-20-one.

5. The process of claim 4 in which the sapogenin derivatives is 11α-hydroxy diosgenin.

6. The process of claim 4 in which the sapogenin derivative is 11α-hydroxy yamogenin.

7. A process for preparing 3-beta,11-alpha-dihydroxy-5-pregnene-20-one comprising converting a sapogenin derivative selected from the group consisting of 11-alpha-hydroxy diosgenin, 11-alpha-hydroxy yamogenin, and the respective mono- and di-acetates thereof to its pseudosapogenin acetate by heating in acetic anhydride containing a trace of acetic acid for 3 to 20 hours at 170°–200° C., oxidizing the pseudosapogenin acetate with chromium trioxide in cold, aqueous acetic acid to produce oxidized pseudosapogenin acetate, hydrolyzing the oxidized pseudosapogenin acetate by prolonged contact with potassium hydroxide in tertiary butanol to produce 3-beta,11-alpha-dihydroxy-5,16-pregnadiene-20-one, and reacting the latter with hydrogen in the presence of a palladium catalyst to hydrogenate the 16,17 double bond to produce 3-beta,11-alpha-dihydroxy-5-pregnene-20-one.

8. The process of claim 7 in which the sapogenin derivative is 11α-hydroxy diosgenin.

9. The process of claim 7 in which the sapogenin derivative is 11α-hydroxy diosgenin.

References Cited in the file of this patent

UNITED STATES PATENTS

| | | |
|---|---|---|
| 2,326,756 | Butenandt et al. | Aug. 17, 1943 |
| 2,335,616 | Tendick | Nov. 30, 1943 |
| 2,395,339 | Marker | Feb. 19, 1946 |
| 2,409,043 | Inhoffen | Oct. 8, 1946 |
| 2,420,489 | Marker | May 13, 1947 |
| 2,666,770 | Wall | Jan. 19, 1954 |
| 2,773,079 | Djerassi | Dec. 4, 1956 |
| 2,776,969 | Rosenkranz | Jan. 8, 1957 |
| 2,885,411 | Muller | May 5, 1959 |